(12) United States Patent
Korzhenko et al.

(10) Patent No.: US 9,909,235 B2
(45) Date of Patent: Mar. 6, 2018

(54) METHOD FOR MANUFACTURING A CARBON FIBRE, PRECURSOR MATERIAL USED BY THE METHOD AND CARBON FIBRE OBTAINED

(71) Applicant: ARKEMA FRANCE, Colombes (FR)

(72) Inventors: Alexander Korzhenko, Pau (FR);
Patrice Gaillard, Hagetaubin (FR);
Andriy Tymoshenko, Pau (FR);
Anatolly Goryashkin, Pau (FR);
Dimitry Zakharov, Pau (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 14/437,701

(22) PCT Filed: Oct. 18, 2013

(86) PCT No.: PCT/FR2013/052495
§ 371 (c)(1),
(2) Date: Apr. 22, 2015

(87) PCT Pub. No.: WO2014/064373
PCT Pub. Date: May 1, 2014

(65) Prior Publication Data
US 2015/0292118 A1 Oct. 15, 2015

(30) Foreign Application Priority Data
Oct. 22, 2012 (FR) .................................... 12 60032

(51) Int. Cl.
*C01B 31/02* (2006.01)
*D01F 9/16* (2006.01)
(Continued)

(52) U.S. Cl.
CPC .................. *D01F 9/16* (2013.01); *C08L 1/26* (2013.01); *D01F 1/10* (2013.01); *D01F 2/00* (2013.01);
(Continued)

(58) Field of Classification Search
CPC ..... D01F 9/16; C01B 31/022; C01B 31/0226; C08L 1/26
See application file for complete search history.

(56) References Cited

U.S. PATENT DOCUMENTS 7,824,651 B2    11/2010  Zhamu et al.
2002/0182138 A1*  12/2002  Olry et al. ................. 423/447.9
(Continued)

FOREIGN PATENT DOCUMENTS

CN      1587457 A      3/2005
CN    102634870 A      8/2012
(Continued)

OTHER PUBLICATIONS

English machine translation of KR20120082287 (2012).*
(Continued)

*Primary Examiner* — Richard M Rump
(74) *Attorney, Agent, or Firm* — Buchanan Ingersoll & Rooney P.C.

(57) ABSTRACT

A method for manufacturing a continuous carbon fiber from a precursor material. According to this method, a precursor material including a continuous natural fiber and carbon nanofillers is used, said natural fiber being obtained from at least one plant constituent such as a cellulose. A process for manufacturing a continuous carbon fiber from a precursor material, including a step of carbonization of said precursor material, in which the precursor material includes a continuous natural fiber and carbon nanofillers, said natural fiber being obtained from at least one plant constituent,
(Continued)

Figure 1:
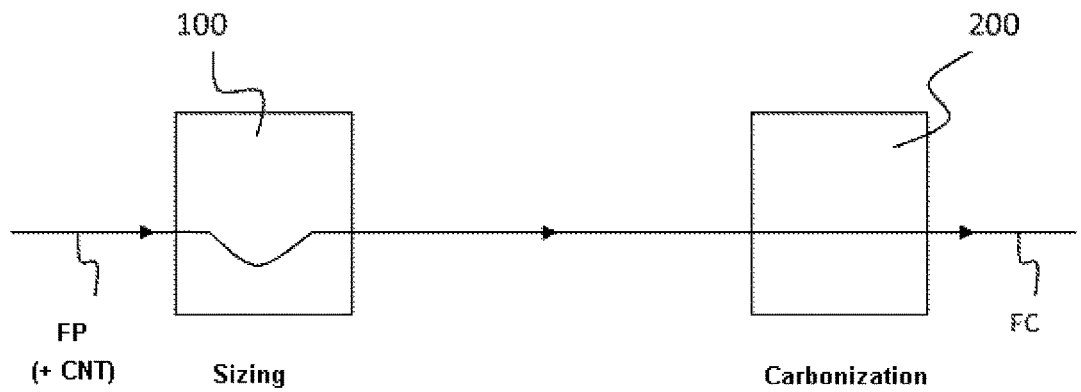

wherein it also includes a step of sizing the precursor material before the carbonization step.

9 Claims, 4 Drawing Sheets

(51) Int. Cl.
*D06M 11/74* (2006.01)
*D01F 1/10* (2006.01)
*D01F 2/00* (2006.01)
*C08L 1/26* (2006.01)
*D06M 101/06* (2006.01)

(52) U.S. Cl.
CPC ........ *D06M 11/74* (2013.01); *D06M 2101/06* (2013.01)

(56) References Cited

U.S. PATENT DOCUMENTS

| | | | |
|---|---|---|---|
| 2006/0177657 A1* | 8/2006 | Weller | C03C 25/26 428/364 |
| 2010/0285223 A1 | 11/2010 | Park et al. | |
| 2011/0285049 A1 | 11/2011 | Baker et al. | |
| 2013/0248087 A1 | 9/2013 | Gaillard et al. | |

FOREIGN PATENT DOCUMENTS

| | | |
|---|---|---|
| JP | 2010-007216 A | 1/2010 |
| KR | 10-2012-0082287 A | 7/2012 |
| WO | WO 01/42541 A2 | 6/2001 |
| WO | WO 03/002456 A2 | 1/2003 |
| WO | WO 2012/066241 A2 | 5/2012 |

OTHER PUBLICATIONS

Baker, F. S. "Low cost carbon fiber from renewable resources." EERE, US Dept of Energy Project ID# Im_03_baker (2010).*

Zhang, Hao, et al. "Regenerated-Cellulose/Multiwalled-Carbon-Nanotube Composite Fibers with Enhanced Mechanical Properties Prepared with the Ionic Liquid 1-Allyl-3-methylimidazolium Chloride." Advanced Materials 19.5 (2007): 698-704.*

Romanov, V. V., et al. "Effect of dissolving conditions on the structure and physicomechanical properties of hydrocellulose fibres spun from solutions of cellulose in N-methylmorpholine-N-oxide." Fibre Chemistry 22.2 (1990): 76-78.*

Lu, Ping, and You-Lo Hsieh. "Multiwalled carbon nanotube (MWCNT) reinforced cellulose fibers by electrospinning." ACS applied materials & interfaces 2.8 (2010): 2413-2420.*

Chen, I-Han, Cheng-Chien Wang, and Chuh-Yung Chen. "Fabrication and structural characterization of polyacrylonitrile and carbon nanofibers containing plasma-modified carbon nanotubes by electrospinning." The Journal of Physical Chemistry C 114.32 (2010): 13532-13539.*

International Search Report (PCT/ISA/210) dated Feb. 11, 2014, by the French Patent Office as the International Searching Authority for International Application No. PCT/FR2013/052495.

Emmnuel Flahaut et al., "GRAM-SCAL CCVD Synthesis of Double-Walled Carbon Nanotubes", Chem. Corn., (2003), 1442-1443.

K.S. Novoselov et al., "Electric Field Effect in Atomically Thin Carbon Films", Science, Oct. 22, 2004, vol. 306, pp. 666-669.

Izabela Janowska et al., "Micro-Wave Synthesis of Large Few-Layer Graphene Sheets in Aqueous Solution of Ammonia", NanoResearch, 2010, vol. 3, pp. 126-137.

Liying Jiao et al., "Narrow Graphene Nanoribbons From Carbon Nanotubes", Nature, vol. 458, pp. 877-880, Apr. 16, 2009.

Enkeleda Dervishi et al., "Large-Scale Graphene Production by RF-cCVD Method", Chem. Commun., 2009, pp. 4061-4063.

Prabhas Jana et al., "Co-Production of Graphene Sheets and Hydrogen by Decompsotion of Methane Using Cobalt Based Catalysts", Energy & Environ. Sci., 2011, 4, pp. 778-783.

Sreekar Bhaviripudi et al., "Role of Kinetic Factors in Chemical Vapor Deposition Synthesis of Uniform Large Area Graphene Using Copper Catalyst", Nano Lett., American Chem. Society, 2010, 10, pp. 4128-4133.

Hye Jin Park et al., "Growth and Properties of Few-Layer Graphene Prepared by Chemical Vapor Deposition", Carbon, 2010, 48, pp. 1088-1094.

A. Varykhalov et al., "Graphene Grown on Co(0001) Films and Island: Electonic Structure and Its Precise Magnetization Dependence", Phys. Rev. B, 2009, 80, pp. 35437-1 to 35437-6.

Xianbao Wang et al., "Large-Scale Synthesis of Few-Layered Graphen Using CVD", Chem. Vap. Deposition, 2009, 15, pp. 53-56.

Enkeleda Dervishi et al., Chem. Mater. Sci., 2009, 21, pp. 5491-5498.

* cited by examiner (Wetting at 50°C)

Activation

Beginning of dissolution at -10°C

Solution ready for use

METHOD FOR MANUFACTURING A CARBON FIBRE, PRECURSOR MATERIAL USED BY THE METHOD AND CARBON FIBRE OBTAINED

The present invention relates to a process for manufacturing a continuous carbon fiber. It also relates to a novel precursor material used by the process and to a carbon fiber obtained by means of said process.

The invention applies to the production of materials or parts in the field of construction and infrastructures, of industrial equipment; of transportation, motor vehicles, railways and shipbuilding; of electricity and electronics; of sport and leisure; and of wind-powered renewable energies.

Polyacrylonitrile is the precursor most widely used at the current time for the manufacture of carbon fibers. The manufacture of carbon fibers with polyacrylonitrile as precursor consists in using polyacrylonitrile fibers (PAN fibers) and in performing a series of treatments on these fibers until carbon fibers are obtained, these treatments comprising in particular carbonization or pyrolysis. First of all, oxidation of the PAN fibers is carried out for a few hours, in air and at a temperature ranging from 200 to 300 degrees Celsius. Sizing and carbonization (pyrolysis) are then carried out. The carbonization is carried out under a dinitrogen atmosphere, at a temperature of 1000 to 1500 degrees for only a few minutes. At the end of these steps, carbon fibers consisting of 90% carbon, approximately 8% nitrogen, 1% oxygen and less than 1% hydrogen are obtained. An additional step, denoted graphitization, is sometimes carried out. This step requires a temperature of 2500 to 3000 degrees applied for a period of approximately one minute. In this case, the final step serves to obtain a material 99% made up of carbon, which makes it considerably more malleable, but also less strong.

In the manufacture of carbon fibers with high or very high tensile strength, the process using PAN fibers provides very good results on the condition, however, that the fiber is precisely attached in the direction supporting the load. The fiber strands are strong in a single direction, and therefore not very robust in the other. These carbon fibers give satisfactory results for the manufacture of composite materials and are widely used in the aeronautical, motor vehicle, electronic component and renewable energy industries. However, their cost price and the management of the manufacturing system, which is quite complex, are blocking factors for a wider use in carbon fiber-based composites having PAN fibers as precursor.

Cellulose-based precursors have the advantage of producing well-structured carbonized structures. In addition, the cost price for the manufacture of carbon fiber using cellulose as precursor is much lower than that of fibers with polyacrylonitrile. However, cellulose-derived carbon fibers have not been the subject of considerable development. The first reason comes from the technical difficulty encountered in producing consistent fibers which withstand the controlled pyrolysis step. The second reason comes from the fact that the mechanical properties of the carbon fibers obtained are very much inferior to those of carbon fibers based on PAN fibers.

Reference may also be made to the following documents:

Document KR 20120082287 describes a process for manufacturing carbon fiber from a precursor material comprising lyocell (cellulose-based fibers originating from wood or from bamboo) and a nanocomposite-graphene material. The use of such a precursor makes it possible to improve the mechanical properties of the fibers, including the elongation properties of said fiber.

Document CN1587457 describes a process for preparing a cellulose-based precursor material for the manufacture of carbon fiber having improved properties and a lower manufacturing cost. The cellulose-based preparation comprises the insertion of soot nanoparticles into the cellulose-based solution.

Document US 2011/285049 describes a process for manufacturing a carbon fiber from a precursor material comprising a continuous lignin fiber including dispersed carbon nanotubes representing 10% by weight or less and preferably from 0.5% to 1.5%. The lignin and the carbon nanotubes are mixed and heated so as to be in the molten state, for extrusion, and spun. This process does not provide for a step of sizing the precursor material.

Document US 2010/285223 describes a process for manufacturing carbon fibers or carbon fabrics, comprising a fiber or fabric stabilization, carbonization and graphitization step, according to which Lyocell fibers or Lyocell fabrics are used and according to which a pretreatment is carried out. This pretreatment takes place before the stabilization treatment and consists in immersing the fibers or fabrics in a solution containing a silicon-based polymer and an aqueous solution comprising a flame-resistant salt. The silicon-based polymer is, for example, polysiloxane (silicone) and the flame-resistant salt comprises ammonium phosphate or sodium phosphate or ammonium chloride. The insertion of carbon nanoparticles into these fibers is not envisioned.

Document WO 2012/066241 describes a process for manufacturing a fibrous material comprising an assembly of one or more fibers, composed of carbon fibers or of glass fibers or of plant fibers or of mineral fibers or of cellulose-based fibers or of polymer-based fibers. The fibrous material is impregnated with a thermosetting polymer or blend of thermosetting polymers containing a hardener and carbon nanotubes. A mixture is used to introduce the hardener and the carbon nanotubes. This mixture can be in the form of a fluid, fibers, a powder or a film. This process does not concern the manufacture of a carbon fiber from a precursor material comprising a natural fiber.

The document Kaburagi et al. describes a texture and structure study carried out on a glass-type carbon fiber having received a graphitization treatment at 3200° C. The carbon fiber was produced with precursor material such as a cellulose fiber. The graphitization could be carried out on this precursor and reveals fine layers of carbon at the surface.

The objective of the invention is to remedy the drawbacks of the prior art by providing a process for manufacturing a continuous carbon fiber in which a precursor material derived from natural resources and more particularly from vegetable biomass, modified by adding carbon nanofillers, is used.

According to the invention, the precursor material is obtained from at least one of the constituents of the vegetable biomass, also called lignocellulosic biomass. The main constituents of said vegetable biomass are cellulose (or linear glucose polysaccharide), hemicelluloses (or branched polysaccharides of sugars containing 5 and 6 carbon atoms) and lignin (an aromatic complex polymer). According to the invention, the precursor material is obtained from cellulose from wood, or flax, hemp, ramie or bamboo, or from lignocelluloses, a combination of cellulose and lignin, for instance in wood fibers, jute fibers, cereal straw fibers, corn stalk fibers, cork fibers or lignin fibers. Preferably, the precursor material is obtained from cellulose from wood, or flax, hemp, ramie or bamboo, or from lignocelluloses, a combination of cellulose and lignin, for instance in wood fibers, jute fibers, cereal straw fibers, corn stalk fibers or cork fibers.

The process for manufacturing a continuous carbon fiber uses, according to the invention, as precursor material, a precursor fiber and carbon nanofillers. The precursor fiber is subsequently referred to as natural fiber since it is obtained from at least one plant constituent and preferably cellulose. In the remainder of the description, the term "natural fiber" is thus intended to mean a fiber produced from a plant constituent such as cellulose from wood, or flax, cotton, hemp, ramie or bamboo, or lignocelluloses, a combination of cellulose and lignin, for instance in wood fibers, jute fibers, cereal straw fibers, corn stalk fibers, cork fibers or lignin fibers.

A subject of the invention is more particularly a process for producing a continuous carbon fiber from a precursor material, comprising a step of carbonization of said precursor material, in which the precursor material comprises a continuous natural fiber and carbon nanofillers, said natural fiber being obtained from at least one plant constituent, mainly characterized in that it also comprises a step of sizing the precursor material before the carbonization step.

The sizing step comprises passing the precursor material through a sizing bath comprising, for example, ammonium chloride and urea or siloxane.

The carbon nanofiller content by weight is from 0.01% to 30% and preferably from 0.01% to 3% and more preferentially from 0.03% to 0.45%, relative to the weight of the natural fiber.

According to a first variant of the process, use is made, as precursor material, of at least one natural fiber modified by introduction of the carbon nanofillers during the manufacture of said natural fiber.

Advantageously, according to this first variant, the carbon nanofillers are introduced by means of an aqueous dispersion in a solution containing a plant constituent used for the manufacture of the natural fiber.

According to a second variant of the process, the precursor material comprises at least one natural fiber modified via a provision of carbon nanofillers, carried out on said fiber before the carbonization step.

According to this second variant, the provision of carbon nanofillers on the natural fiber is preferentially carried out during the sizing step, the carbon nanofillers being introduced into the sizing bath.

Optionally, the process also comprises a graphitization step carried out after the carbonization step, at a temperature of between 2000° C. and 3000° C., preferably greater than 2000° C. and preferably than 2200° C., for a period of 8 to 15 minutes, preferably for 11 minutes.

Advantageously, the natural fibers are obtained from a solution of cellulose, preferably of cellulose from wood, flax, cotton, hemp, ramie or bamboo, or of lignocelluloses, a combination of cellulose and lignin, for instance in wood fibers, jute fibers, cereal straw fibers, corn stalk fibers or cork fibers; followed by extrusion in a die so as to form a continuous fiber, for instance a hydrocellulose fiber, or else obtained from lignin after extrusion so as to form a lignin fiber.

Another subject of the invention relates to a precursor material for the manufacture of a continuous carbon fiber, comprising a natural fiber and carbon nanofillers, said natural fiber being obtained from at least one plant constituent, preferably cellulose, chosen from cellulose from wood, flax, hemp, ramie or bamboo and preferably cellulose from wood or lignocelluloses, a combination of cellulose and lignin, for instance in wood fibers, jute fibers, cereal straw fibers, corn stalk fibers, cork fibers or lignin fibers.

Preferably, the natural fiber is obtained from cellulose or from lignocelluloses.

Advantageously, the precursor material comprises a natural fiber containing the carbon nanofillers representing by weight 0.01% to 30% and preferably 0.01% to 3% and more preferentially 0.03% to 0.45% or a natural fiber coated with a composition containing the carbon nanofillers representing by weight 0.01% to 30% of the weight of the fiber and preferably 0.01% to 3% and more preferentially 0.03% to 0.45%.

Another subject of the present invention relates to a carbon fiber which can be obtained according to the process described, or which can be obtained with the precursor material previously described.

According to the invention, the carbon nanofillers are carbon nanotubes or graphenes, alone or as a mixture in any proportions.

It is recalled that carbon nanotubes, CNTs, may be of the single-walled, double-walled or multi-walled type. The double-walled nanotubes can in particular be prepared as described by Flahaut et al., in Chem. Com. (2003), 1442. The multi-walled nanotubes can, for their part, be prepared as described in document WO 03/02456.

The nanotubes usually have an average diameter ranging from 0.1 to 100 nm, preferably from 0.4 to 50 nm, better still from 1 to 30 nm, or even from 10 to 15 nm, and advantageously a length of 0.1 to 10 µm. Their length/diameter ratio is preferably greater than 10 and usually greater than 100. Their specific surface area is, for example, between 100 and 300 $m^2/g$, advantageously between 200 and 300 $m^2/g$, and their apparent density may in particular be between 0.05 and 0.5 $g/cm^3$ and more preferentially between 0.1 and 0.2 $g/cm^3$. The multi-walled nanotubes may, for example, comprise from 5 to 15 sheets (or walls) and more preferentially from 7 to 10 sheets. These nanotubes may or may not be treated.

An example of crude carbon nanotubes is in particular commercially available from the company Arkema under the trade name Graphistrength® C100.

These nanotubes can be purified and/or treated (for example oxidized) and/or ground and/or functionalized, before they are used in the process according to the invention.

The grinding of the nanotubes can be carried out in particular under cold conditions or under hot conditions and can be carried out according to the known techniques used in devices such as ball mills, hammer mills, edge runner mills, knife mills, gas jet mills or any other grinding system capable of reducing the size of the entangled network of nanotubes. It is preferable for this grinding step to be carried out according to a gas jet grinding technique and in particular in an air jet mill.

The crude or ground nanotubes can be purified by washing with a sulfuric acid solution, so as to free them from possible residual inorganic and metallic impurities, such as, for example, iron, originating from their preparation process. The ratio by weight of the nanotubes to the sulfuric acid can in particular be between 1:2 and 1:3. The purification operation can, moreover, be carried out at a temperature ranging from 90 to 120° C., for example for a period of 5 to 10 hours. This operation can advantageously be followed by steps of rinsing with water and of drying the purified nanotubes. The nanotubes can, as a variant, be purified by heat treatment at a high temperature, typically greater than 1000° C.

The nanotubes are advantageously oxidized by being brought into contact with a sodium hypochlorite solution containing from 0.5% to 15% by weight of NaOCl and preferably from 1% to 10% by weight of NaOCl, for example in a ratio by weight of the nanotubes to the sodium hypochlorite ranging from 1:0.1 to 1:1. The oxidation is advantageously carried out at a temperature of less than 60° C. and preferably at ambient temperature, for a period ranging from a few minutes to 24 hours. This oxidation operation can advantageously be followed by steps of filtering and/or centrifuging, washing and drying the oxidized nanotubes.

The nanotubes can be functionalized by grafting reactive units, such as vinyl monomers, at the surface of the nanotubes. The constituent material of the nanotubes is used as radical polymerization initiator after having been subjected to a heat treatment at more than 900° C., in an anhydrous and oxygen-free environment, which is intended to remove the oxygen-comprising groups from its surface.

In addition, it is recalled that graphene is a material discovered in 2004 and manufactured since then on an industrial scale. It is a two-dimensional crystal consisting of carbon atoms arranged as a bee's nest, the stacking of which constitutes graphite (where 1 mm of graphite contains several million sheets of graphene). Various processes for preparing graphene have been proposed in the literature, including processes termed mechanical exfoliation and chemical exfoliation consisting in tearing off graphite sheets by successive layers, respectively by means of an adhesive tape (Geim A. K., Science, 306: 666, 2004) or using reagents, such as sulfuric acid combined with nitric acid, inserting between the graphite layers and oxidizing them, so as to form graphite oxide which can be easily exfoliated in water in the presence of ultrasound. Another exfoliation technique consists in subjecting graphite in solution to ultrasound, in the presence of a surfactant (U.S. Pat. No. 7,824,651). It is also possible to obtain graphene particles by cleavage of carbon nanotubes along the longitudinal axis ("Micro-Wave Synthesis of Large Few-Layer Graphene Sheets in Aqueous Solution of Ammonia", Janowska, I. et al., NanoResearch, 2009 or "Narrow Graphene nanoribbons from Carbon Nanotubes", Jiao L. et al., Nature, 458: 877-880, 2009). Yet another method for preparing graphene consists in decomposing silicon carbide at high temperature under vacuum.

Finally, several authors have described a process for synthesizing graphene by chemical vapor deposition (CVD), optionally combined with a radiofrequency generator (RF-CVD) (Dervishi et al., J. Mater. Sci., 47:1910-1919, 2012; Dervishi et al., Chem. Commun., 4061-4063, 2009; Prabhas et al., Energy Environ. Sci., 4:778-783, 2011).

Synthesis by CVD on a metallic film is generally distinguished from synthesis by CVD using a pulverulent catalyst.

The process for synthesizing graphene by CVD on metallic films (Co, Cu, Ni) deposited on flat substrates involves the decomposition of hydrocarbons at temperatures generally ranging from 800° C. to 1000° C., (S. Bhaviripudi et al., Nano Lett., 2010, 10, 4128; H. J. Park et al., Carbon, 2010, 48, 1088; A. Varykhalov et al., Phys. Rev. B, 2009, 80, 35437).

The production of graphene by CVD using catalysts in powder form has been described, moreover, by Wang et al., Chem. Vap. Deposition, 15:53-56, 2009 based on the decomposition of methane at 1000° C. on cobalt supported on MgO, or by Dervishi et al., Chem. Mater., 21:5491-5498, 2009 by decomposition of acetylene at 1000° C. on an Fe—Co/MgO system.

Thus, the term "graphene" denotes an isolated and individualized flat graphite sheet, but also, by extension, an assembly comprising between one and a few tens of sheets and having a flat or more or less undulated structure. This definition thus encompasses FLGs (Few Layer Graphenes), NGPs (Nanosized Graphene Plates), CNSs (Carbon NanoSheets) and GNRs (Graphene NanoRibbons). On the other hand, it excludes carbon nanotubes and nanofibers, which respectively consist of the coaxial winding of one or more graphene sheets and the turbostratic stacking of these sheets.

The graphene used in the process can be obtained by chemical vapor deposition or CVD, preferably according to a process using a pulverulent catalyst based on a mixed oxide. It is characteristically in the form of particles having a thickness of less than 50 nm, preferably of less than 15 nm, more preferentially of less than 5 nm and having lateral dimensions of less than 1 micron, from 10 to 1000 nm, preferentially from 50 to 600 nm, and more preferentially from 100 to 400 nm. Each of these particles generally contains from 1 to 50 sheets, preferably from 1 to 20 sheets and more preferentially from 1 to 10 sheets, or even from 1 to 5 sheets which can be broken up from one another in the form of independent sheets, for example during a treatment by ultrasound.

Figure 2:
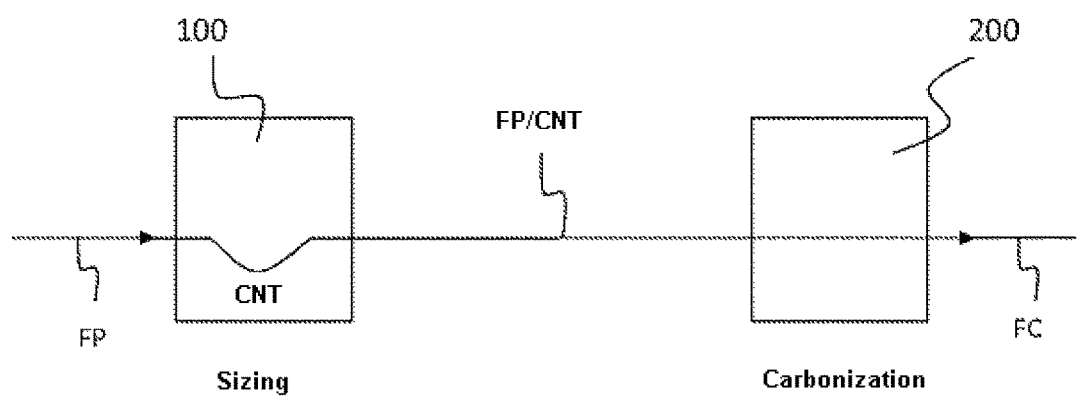
Figure 3:
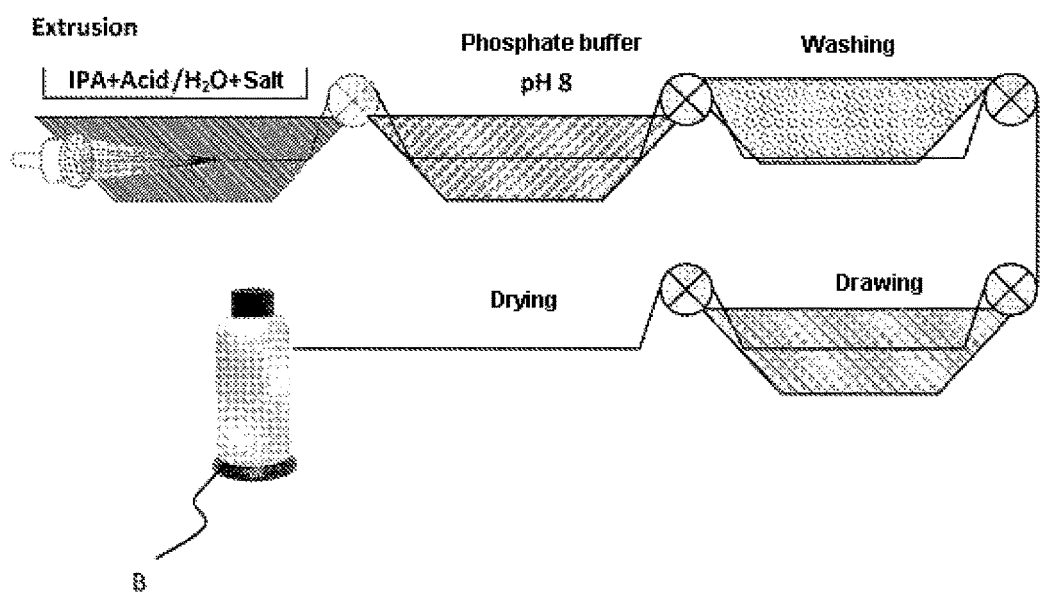
Figure 4:
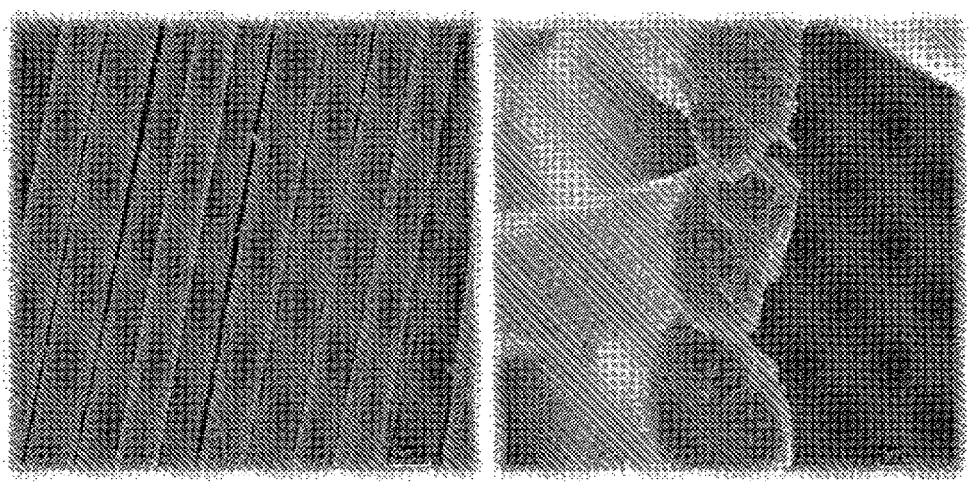
Figure 5:
Figure 6:
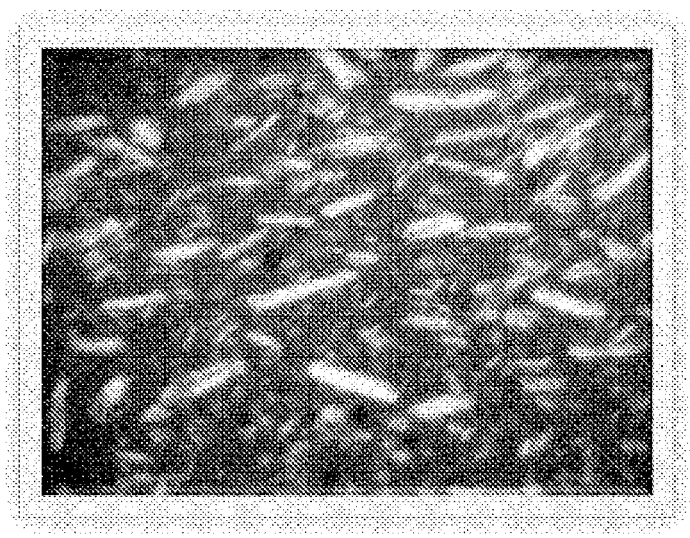
Figure 7:
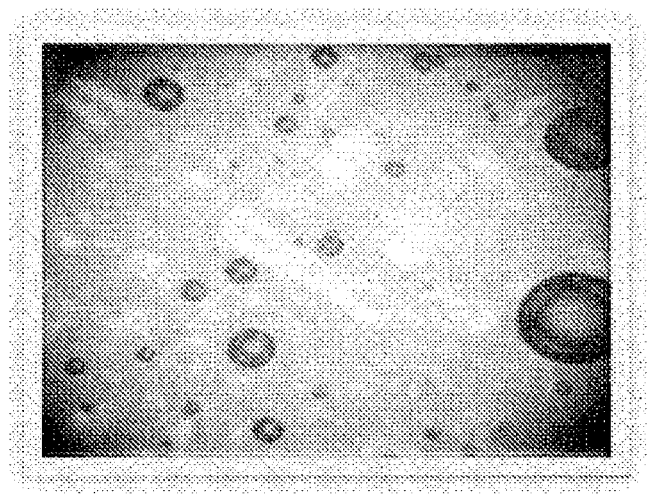
Figure 8:
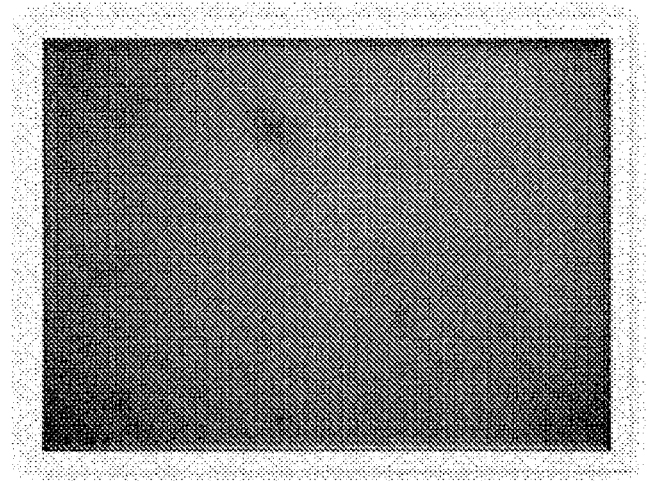

Other particularities and advantages of the invention will emerge on reading the following description, provided in the interests of simplification in the case where the continuous natural fiber FP is a fiber obtained from cellulose and the carbon nanofillers are carbon nanotubes, and given by way of illustrative and nonlimiting example, with reference to the appended figures which represent:

FIG. 1, a scheme illustrating the steps of the process for manufacturing a carbon fiber according to a first variant of the invention, FIG. 2, a scheme illustrating the steps of the process for manufacturing a carbon fiber according to a second variant of the invention, FIG. 3, a scheme illustrating the steps for producing the natural fiber FP, FIG. 4, an electron microscope image with, on the left, the fibrils forming the natural fiber FP produced and, on the right, samples of fibers after breaking, FIG. 5, an electron microscope image of cellulose during wetting at 50° C., FIG. 6, an electron microscope image of the cellulose activated in a mixer, FIG. 7, an electron microscope image of the beginning of the dissolution at −10° C., FIG. 8, an electron microscope image of the cellulose solution ready to be used in a die for extrusion as illustrated by the scheme of FIG. 3.

In the description which follows, the precursor material is made of a continuous natural fiber of hydrocellulose type FP and the carbon nanofillers are carbon nanotubes CNTs.

In this example, the continuous carbon fiber FC is therefore produced from a hydrocellulose fiber FP, modified by adding carbon nanotubes CNTs.

According to the invention, two variants are proposed and illustrated respectively by FIGS. 1 and 2:

a first variant consists in introducing the carbon nanotubes during the manufacture of the hydrocellulose fiber FP, the fiber used as precursor thus containing the carbon nanotubes (FP+CNT), a second variant consists in providing carbon nanotubes after the manufacture of the hydrocellulose fiber.

Of course, in the process for manufacturing a continuous carbon fiber, the production of the natural fiber FP, namely the hydrocellulose fiber, takes place beforehand, as illustrated for example in FIG. 3. The continuous hydrocellulose fiber is, for example, wound on a spool B. The natural fiber can also be manufactured continuously by successively carrying out all the steps, including the steps for producing the hydrocellulose fiber, until a carbon fiber is obtained.

In the example of practical implementation described hereinafter, the following steps were carried out:

Step 1. Crude Cellulose Activation 210 g of cellulose of wood origin were placed in a reactor containing 3 kg of orthophosphoric acid at 50° C. This mixture was stirred using a paddle mixer for 10 min.

Step 2. Dissolution

The mixture was cooled to −10° C. at a rate equal to, or approximately equal to, 2° C./min. Dissolution is obtained in 3 hours.

FIGS. 5, 6, 7 and 8 illustrate, by electron microscopy, the solution during its preparation.

Step 3. Addition of the Carbon Nanotubes

A dispersion of carbon nanotubes was prepared beforehand from a masterbatch based on Graphistrength® CW2-45 carboxymethylcellulose produced by the company Arkema.

For Implementation of the First Variant:

A part of the solution of cellulose in phosphoric acid, obtained at the end of step 2, was doped with this aqueous dispersion containing 2% by weight of carbon nanotubes.

2 Formulations as Follows were Subsequently Used:
1) A first formulation containing 7% cellulose in phosphoric acid $H_3PO_4$.
2) A second formulation containing 7% cellulose and 0.03% of carbon nanotubes in phosphoric acid $H_3PO_4$.

Step 4. Manufacture of the Hydrocellulose Fibers FP (Natural Fibers) (FIG. 3)

The solution was extruded using a 60-hole die having a hole diameter of 400 μm at a temperature of 45° C. in an isopropanol-based coagulation bath as illustrated in FIG. 3. The fiber at the die outlet has a diameter of 60 micrometers. This fiber consists of aligned fibrils as illustrated by the image in FIG. 4.

After washing and drying, the fibers are wound on the spool B.

The hydrocellulose fibers FP obtained are consistent, whether or not these fibers contain carbon nanotubes (fibers resulting from the first formulation or from the second formulation).

The mechanical properties were tested under the following conditions:
pull rate 2 mm/minute
fixed tested fiber sample length: 10 mm
dynamometric cell: 20 cN (centi-Newton).

The following table makes it possible to illustrate the results measured for the tenacity (N/dtex) and elongation (%) parameters for hydrocellulose fibers and hydrocellulose fibers modified by adding 0.045% by weight of CNTs.

| Parameters | Hydrocellulose | Hydrocellulose + 0.045% CNTs |
|---|---|---|
| Tenacity, cN/dtex | 2-3 | 4-5 |
| Elongation, % | 6-10% | 12-16% |

It is already noted with this first comparative table that a greater tenacity is obtained for fibers doped with CNTs (i.e. fibers containing CNTs).

Step 5. Sizing (Reference 100 in FIGS. 1 and 2)—Carbonization (Without Orientation) (Reference 200 in FIGS. 1 and 2)

The hydrocellulose fibers FP resulting from the first formulation (without CNTs) are passed through a bath of ammonium chloride and urea into which CNTs are introduced at a content of 0.045% by weight (FIG. 2).

The test was carried out with carbonization without orientation.

carbonization conditions: the fibers pass through an oven of which the temperature is brought successively to 1° C., 10° C., 190, 210, 240, 270, 270, 330, 430, 600° C. with a travel speed of 7.8 m/h, and a duration of passage of 40 minutes.

The objective of an orientation carried out during the carbonization by drawing a carbon fiber is to improve the mechanical properties of the carbon fiber obtained. The improvement can reach several times the strength of the carbon fibers when CNTs have been added.

The table below illustrates a comparison regarding the breaking strength and the elongation with a sizing treatment, carried out in one example by passing the fiber FP through a bath of ammonium chloride $NH_4Cl$ urea, and in another example through an aqueous bath containing 5% of siloxane. Each test was carried out, on the one hand, with CNTs being provided in the bath, and, on the other hand, as a comparison without the provision of CNTs, the fibers being hydrocellulose fibers FP obtained from the first formulation.

For the treatment with $NH_4Cl$+urea, a load of 0.045% by weight of CNTs was introduced.

For the treatment with an aqueous solution comprising siloxane, a load of 0.45% by weight of CNTs was introduced.

| | Breaking strength, Mpa | Elongation, % |
|---|---|---|
| $NH_4Cl$ + Urea treatment | 65 ± 5 | 2-4 |
| 0.045% CNTs; $NH_4Cl$ + urea treatment | 235 ± 5 | 2-4 |
| Treatment: 5% siloxane + water | 85 ± 10 | 2-4 |
| 0.45% CNTs; treatment: 5% siloxane + water | 365 ± 10 | 2-4 |

The results are better for the two treatment examples when CNTs were added to the bath.

Step 6. Graphitization

Passage through an oven at 2200° C. for 11 min, argon atmosphere.

| | Breaking strength Mpa |
|---|---|
| 0.045% CNTs; $NH_4Cl$ + urea treatment before graphitization | 235 ± 5 |
| 0.045% CNTs; $NH_4Cl$ + urea treatment after graphitization | 410 ± 10 |
| 0.45% CNTs treatment: 5% siloxane + water before graphitization | 365 ± 10 |
| 0.45% CNTs treatment: 5% siloxane + water after graphitization | 415 ± 10 |

It is seen from the comparative table above that the breaking strength results are identical before and after graphitization. This graphitization step is not necessary if the sizing is optimized so as to provide good mechanical strength results, which corresponds to the examples of the previous table.

The natural fibers produced from cellulose or from lignocellulose have a diameter of from 5 micrometers to 200 micrometers, preferably from 5 micrometers to 100 micrometers and preferably from 5 to 60 micrometers.

After the carbonization step, the carbon fibers have a diameter of 5 micrometers.

In the case where the plant constituent chosen is lignin, the carbon fiber is preferably manufactured according to the second variant of the process, namely by provision of carbon nanofillers in the sizing bath.

Thus, the present invention consists in choosing as precursor a natural resource such as plant constituents, preferably cellulose, chosen from cellulose from wood, flax, cotton, hemp, ramie or bamboo, and preferably cellulose from wood or lignocelluloses, a combination of cellulose and lignin, for instance in wood fibers, jute fibers, cereal straw fibers, corn stalk fibers, cork fibers of lignin fibers, and in modifying this precursor with carbon nanofillers such as carbon nanotubes or graphenes, alone or as a mixture, so as to obtain a precursor which has a higher performance level and is more effective for the carbonization yield, giving a carbonized material having a higher performance level and at a lower cost than precursors such as PAN fibers.

The carbon fibers obtained by means of the process of the invention or with the precursor material according to the invention can advantageously be used in applications such as sport, wind-powered energy, transportation or shipbuilding, and in applications for which glass fiber is used with advantages and in particular a reduction in the weight of the structures since there is a change from a density of 2.7 for glass to 1.5 for the carbon fiber obtained by means of the process, while allowing a notable increase in the tensile modulus Quite obviously, for all the applications where glass fiber is used, the carbon fibers according to the invention may also be mixed with glass fibers, according to the known techniques of comixing, weaving or knitting.

The precursor is produced in the form of continuous fibers from at least one vegetable constituent and preferably cellulose, such as, for example, hydrocellulose fibers.

The modification of the precursor can be carried out by integration of the carbon nanofillers into the precursor fibers during their production, or in the sizing step before the carbonization.

In the two variants, the carbon nanofillers allow the formation of structured carbon structures during the controlled pyrolysis of the fiber. The modification of the precursor material by providing carbon nanofillers also enables an improvement in the degree of carbonization of 20% to 30%.

The invention claimed is:

1. A process for manufacturing a continuous carbon fiber from a precursor material, comprising a step of carbonization of said precursor material, in which the precursor material comprises a continuous natural fiber and carbon nanofillers, said natural fiber being obtained from at least one plant constituent, wherein the process also comprises a step of sizing the precursor material before the carbonization step,
   wherein the carbon nanofillers are carbon nanotubes, and
   wherein the carbon nanofillers content by weight is from 0.01% to 0.45%, relative to the weight of the natural fiber
   wherein the natural fiber is obtained from a solution of cellulose, and extrusion in a die so as to form a continuous hydrocellulose fiber.

2. The process for manufacturing a carbon fiber as claimed in claim 1, wherein the precursor material comprises at least one natural fiber modified by introduction of the carbon nanofillers during the manufacture of said natural fiber.

3. The process for manufacturing a carbon fiber as claimed in claim 2, wherein the carbon nanofillers are introduced by means of an aqueous dispersion in a solution containing at least one plant constituent used for the manufacture of the natural fiber.

4. The process for manufacturing a carbon fiber as claimed in claim 1, wherein the precursor material comprises at least one natural fiber modified via provision of carbon nanofillers, carried out on said fiber before the carbonization step.

5. The process for manufacturing a carbon fiber as claimed in claim 1, wherein the provision of carbon nanofillers on the natural fiber is carried out during the sizing step, the carbon nanofillers being introduced into the sizing bath.

6. The process for manufacturing a carbon fiber as claimed in claim 1, wherein the natural fiber is obtained from cellulose or from lignocellulose.

7. The process for manufacturing a carbon fiber as claimed in claim 1, wherein the carbon nanofillers content by weight is from 0.03% to 0.45%, relative to the weight of the natural fiber.

8. The process for manufacturing a carbon fiber as claimed in claim 1, wherein the sizing step comprises passing the precursor material through a sizing bath comprising ammonium chloride and urea.

9. The process for manufacturing a carbon fiber as claimed in claim 1, wherein the process comprises a graphitization step carried out after the carbonization step, at a temperature of 2000° C. to 3000° C., for a period of 8 to 15 minutes.

* * * * *